(12) United States Patent
Wetzel et al.

(10) Patent No.: US 7,353,869 B2
(45) Date of Patent: Apr. 8, 2008

(54) SYSTEM AND METHOD FOR UTILIZING A SKIN SENSOR IN A DOWNHOLE APPLICATION

(75) Inventors: Rodney J. Wetzel, Katy, TX (US); Randolph J. Sheffield, Sugar Land, TX (US); Rashmi B. Bhavsar, Houston, TX (US); Philippe Gambier, Houston, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 363 days.

(21) Appl. No.: 10/904,327

(22) Filed: Nov. 4, 2004

(65) Prior Publication Data

US 2006/0090892 A1  May 4, 2006

(51) Int. Cl.
*E21B 47/06* (2006.01)

(52) U.S. Cl. .................. 166/250.01; 166/250.07; 166/66; 73/152.51

(58) Field of Classification Search .......... 166/250.07, 166/250.16, 66, 250.01; 73/152.45, 152.47, 73/125.51, 152.51

See application file for complete search history.

(56) References Cited

U.S. PATENT DOCUMENTS

| | | | | |
|---|---|---|---|---|
| 5,509,474 A | * | 4/1996 | Cooke, Jr. ................. | 166/64 |
| 6,050,131 A | * | 4/2000 | Willauer .................... | 73/37 |
| 6,554,064 B1 | * | 4/2003 | Restarick et al. ...... | 166/250.01 |
| 2005/0012036 A1 | * | 1/2005 | Tubel et al. ............ | 250/227.14 |
| 2005/0021247 A1 | * | 1/2005 | Liu et al. ................. | 702/42 |
| 2005/0263281 A1 | * | 12/2005 | Lovell et al. ............ | 166/255.1 |

OTHER PUBLICATIONS

Brown, Chappel, "E-textiles, Robot 'Skin' Among Advances at IEDM", EE Times, Oct. 10, 2003, Article Id = 18309849.
Engle, Jonathan; Chen, Jack; Chang, Liu; Flachsbart, Bruce R.; Selby, John C.; Shannon, Mark A.; "Development of Polyimide-based Flexible Tactile Sensing Skin"; Materials Research Society Symposium Proc., vol. 736, D4.5.1-D4.5.6, 2003, Materials Research Society.
Hakozaki, Mitsuhiro; Hatori, Atsushi; Shinoda, Hiroyuki; "A Sensitive Skin Using Wireless Tactile Sensing Elements"; Technical Digest of the 18th Sensor Symposium, 2001. pp. 147-150.
Yamada, Yoji; Iwanaga, Yoshihiro; Fukunaga, Masakuzu; Fujimoto, Noboru; Ohta, Eiji; Morizono, Tetsuya; Umetani, Yoji; Soft Viscoelastic Robot Skin Capable of Accurately Sensing Contact Location of Objects; Toyota Technological Institute.
Dekker, R. et al.; "Substrate Transfer Technology for RF Applications"; 2004 IEEE International Electron Devices Meeting.
"Robot Skin Stretches to the Task"; New Scientist.com; Exclusive from New Scientist Print Edition; Oct. 22, 2003.

\* cited by examiner

*Primary Examiner*—Jennifer H. Gay
*Assistant Examiner*—Robert E Fuller
(74) *Attorney, Agent, or Firm*—Robert Van Someren; Daryl R. Wright; Bryan P. Galloway

(57) ABSTRACT

A system and method is provided for sensing a variety of parameters in well-related environments. A skin sensor is deployed in downhole applications to obtain data used in analyzing well characteristics.

26 Claims, 7 Drawing Sheets

SYSTEM AND METHOD FOR UTILIZING A SKIN SENSOR IN A DOWNHOLE APPLICATION

BACKGROUND

In a variety of subterranean environments, such as wellbore environments, sensors are used to detect or measure well related parameters. However, utilization of current sensor technology can be difficult and/or undesirably expensive in many of these applications, such as certain downhole applications that would benefit from multipoint sensing. The physical size of certain sensors can lead to added difficulties in applications where available space is limited.

Additionally, some sensors can present telemetry difficulties in the transfer of sensor signal output from a downhole location to a desired collection location. Also, with some sensors, the harsh environment of a wellbore can have a deleterious effect on the specific sensing element used to obtain data on a given well related parameter.

SUMMARY

In general, the present invention provides a skin sensor for use in well related applications. The skin sensor provides a compact sensing system with multiple sensors able to provide independent outputs with respect to a given parameter.

BRIEF DESCRIPTION OF THE DRAWINGS

Certain embodiments of the invention will hereafter be described with reference to the accompanying drawings, wherein like reference numerals denote like elements, and.

DETAILED DESCRIPTION

In the following description, numerous details are set forth to provide an understanding of the present invention. However, it will be understood by those of ordinary skill in the art that the present invention may be practiced without these details and that numerous variations or modifications from the described embodiments may be possible.

The present invention generally relates to sensing selected parameters in a variety of well-related environments. The sensing is accomplished by a one or more skin sensors. Each skin sensor comprises a thin, flexible, skin-like material having a plurality of thin sensors arranged linearly or in arrays. For example, the skin sensor may be formed of a thin, tough, elastic material with embedded sensors. The structure of the skin sensor enables their use in tight spaces and/or on flexing/moving components. Also, the skin sensor can be utilized with many types of downhole completions and other production equipment. However, the devices and methods of the present invention are not limited to use in the specific applications that are described herein.

Figure 1:
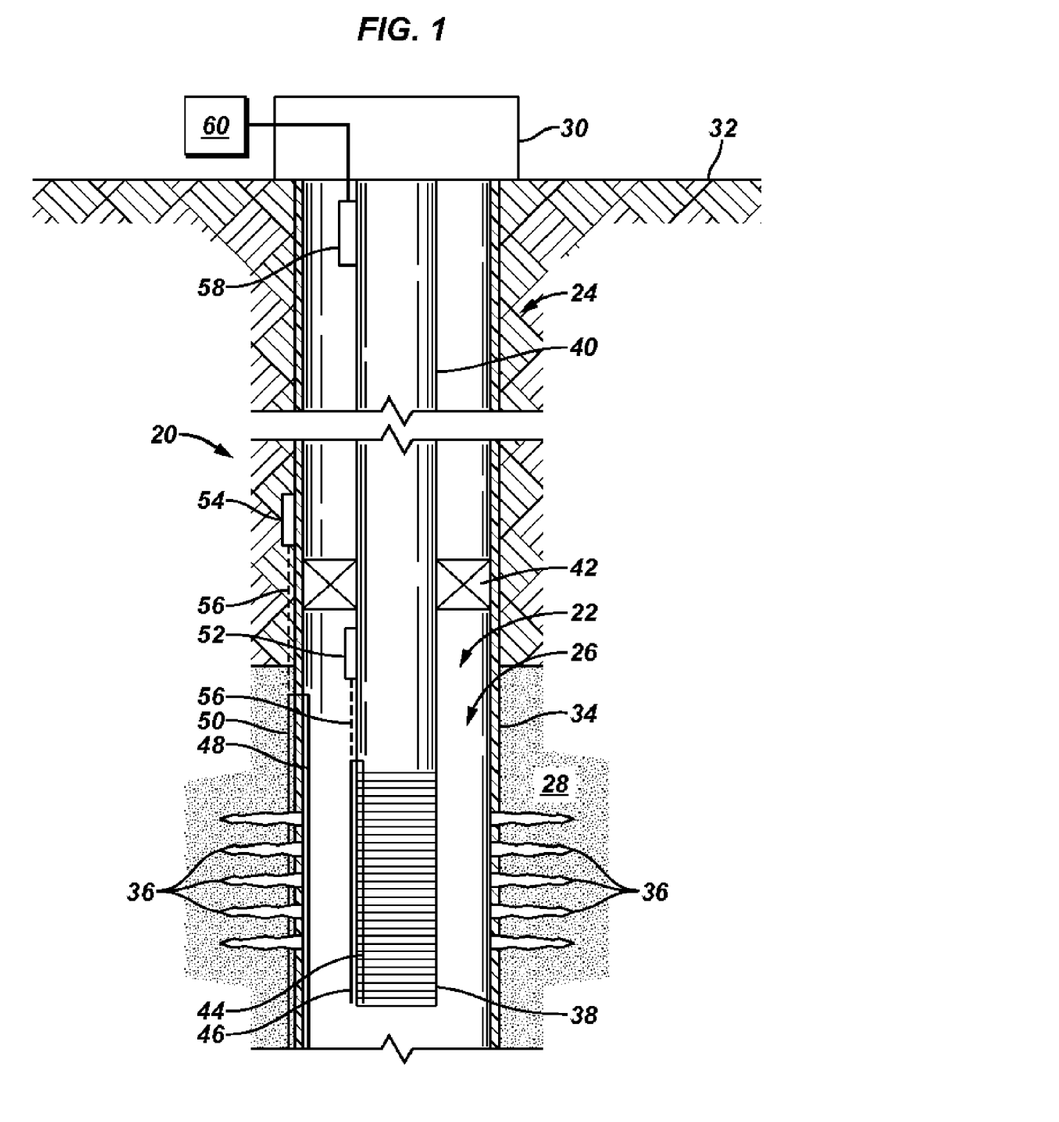
FIG. 1 is a front elevation view of a completion and a sensor system in a well, according to an embodiment of the present invention.

Referring generally to FIG. 1, a system 20 is illustrated according to an embodiment of the present invention. In the particular embodiment illustrated, system 20 comprises a completion 22 disposed in a well 24 formed by a wellbore 26 drilled into a formation 28. Formation 28 may hold desirable production fluids, such as oil. It should be noted, however, that system 20 also may comprise other types of tools and be used for other types of services. For example, system 20 may be used in coiled tubing applications, wireline and slickline services, drilling equipment and services, testing equipment and services, gas production related equipment and services, and other tools and services.

In this example, completion 22 extends downwardly into wellbore 26 from a wellhead 30 disposed at a surface 32, such as the surface of the earth. The wellbore 26 may be lined, for example, with a casing 34 having perforations 36. Perforations 36 enable the flow of fluid from formation 28 into wellbore 26 or from wellbore 26 into formation 28. Completion 22 may comprise a wide variety of components, but in this example, comprises at least a sand screen 38 suspended on a tubing 40 that extends upwardly to wellhead 30. Other components, such as a packer 42, may be utilized with system 20.

System 20 also comprises one or more skin sensors, such as skin sensors 44, 46, 48 and 50. In an actual application, it may only be necessary to utilize one of the skin sensors but multiple skin sensors will be described to facilitate an understanding of alternate or additive uses. For example, skin sensor 44 is deployed along the interior of sand screen 38, and skin sensor 46 is deployed along an exterior of sand screen 38. Skin sensor 48, on the other hand, is deployed along an interior of casing 34, and skin sensor 50 is deployed along an exterior of casing 34.

In the embodiment illustrated, skin sensors 44 and 46 are wired to a transmitter 52, and skin sensors 48 and 50 are wired to a transmitter 54. The transmitter or transmitters can be disposed proximate the corresponding skin sensor(s), or they can be disposed at a distance from the sensors and connected by an appropriate communication line 56. The skin sensors provide data on a given parameter or parameters sensed at multiple points. The data can be sent wirelessly by the transmitter 52, 54 to a receiver 58. Receiver 58 is formed as a component of a control system 60 or provides the accumulated data to control system 60 for further processing and/or use by a well operator. Control 60 is, for example, a processor based control system having appropriate input and output devices, such as a typical computer-based control system.

Figure 2:
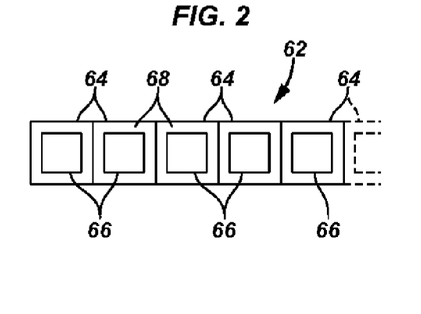
FIG. 2 is a schematic illustration of an embodiment of a skin sensor that may be used with the system illustrated in FIG. 1.

Examples of skin sensors are illustrated in FIGS. 2-5. Referring first to FIG. 2, a skin sensor 62 is illustrated in the form of a skin sensor tape having sequentially arranged units or cells 64. Each cell 64 comprises a sensor element 66 that provides independent sensing capability with respect to the other sensor elements. The sensor elements 66 are generally flat and encapsulated in a sensor skin 68, such as a flexible, polymeric skin able to withstand the temperatures and pressures of a wellbore environment. This enables the tape style skin sensor to be bent, wrapped, twisted and positioned in a variety of arcuate or contorted orientations while still providing multipoint sensing capability. Any of the sensors illustrated in FIG. 1, e.g. sensors 44, 46, 48 and 50, can be formed as skin sensor 62 described herein.

Figure 3:
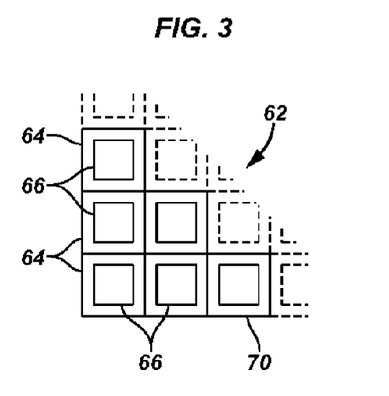
FIG. 3 is a schematic illustration of an alternate embodiment of a skin sensor that may be used with the system illustrated in FIG. 1.

The sensor skin 62 also can be arranged in a variety of other formats. In FIG. 3, for example, the skin sensor 62 has multiple cells 64 arranged in a sheet 70. Regardless of the format, the skin sensors provide great flexibility for a wide variety of applications. In downhole environments, the skin sensor can be used not only as a multipoint sensor but also as a pathway of communication because the sensor elements are electrically linked. Thus, in some applications, a skin sensor 62, such as the tape style sensor illustrated in FIG. 2, can be used in lieu of a cable or wires for carrying signals. Additionally, because skin 68 effectively provides the interface for detecting a sensed parameter, the sensor elements 66 remain protected in hostile wellbore environment.

Figure 4:
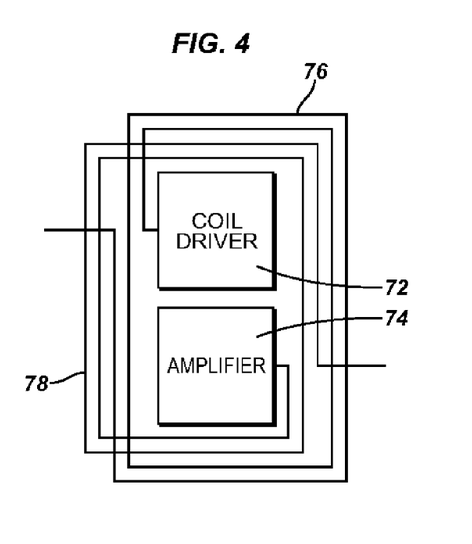
FIG. 4 is schematic illustration of a sensor element that can be utilized in each unit of a skin sensor, according to an embodiment of the present invention.
Figure 5:
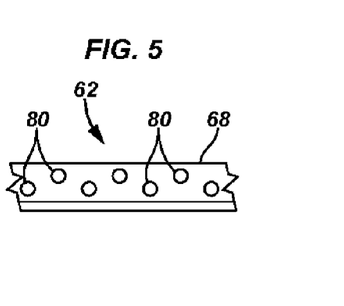
FIG. 5 is a schematic illustration of an alternate embodiment of a skin sensor that may be used with the system illustrated in FIG. 1.

A variety of sensor cell architectures potentially can be utilized, but in the sample illustrated in FIGS. 2 and 3, a one-dimensional film coil array is provided. Wireless sensing elements 66 are contained in skin 68 and powered by the film. The film also exchanges signals with the sensing elements through inductive coupling. Additionally, each cell on the one-dimensional film is driven independently to enable overlapping of the films. As illustrated in FIG. 4, each cell on the one-dimensional film coil array has a driving coil 72 and a signal amplifier 74. Additionally, each cell comprises a powering coil 76 and a sensing coil 78 along with an appropriate interface circuit for access from a processor, such as controller 60. As illustrated in FIG. 5, a similar sensor element is able to transmit air pressure within one or more cavities 80 disposed within skin 68. The sensor elements can be designed to transmit the pressure data wirelessly. Power supply and signal transmission can be done through inductive coupling between the coils on the sensor element and a powering coil on the one dimensional film coil array. Additional discussion of skin sensors is available in an article written by Mitsuhiro Hakozaki, Atsushi Hatori and Hiroyuki Shinoda, entitled A Sensitive Skin Using Wireless Tactile Sensing Elements, found in the Technical Digest of the 18th Sensor Symposium, 2001, pages 147-150.

As discussed above, the skin sensor 62 can be formed as a pressure sensor to sense pressures at multiple points. However, the skin sensor can be designed with multiple sensing elements for detecting a variety of other parameters. For example, the skin sensor may comprise sensing elements designed to detect temperature, resistivity, acoustic events and other characteristics of interest in a downhole environment.

Figure 6:
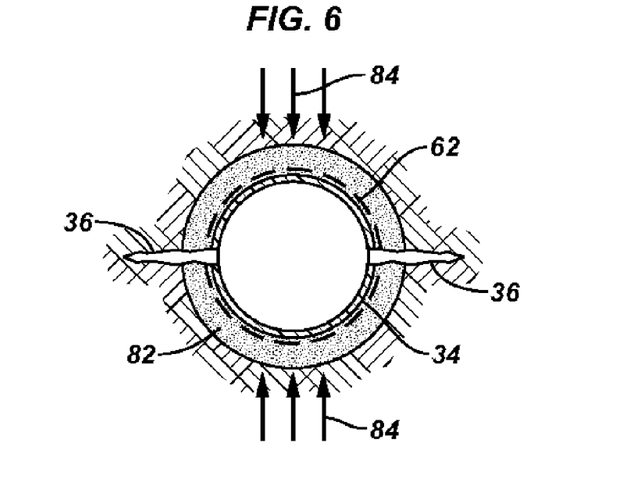
FIG. 6 is a cross-sectional view of a wellbore section in which a skin sensor is utilized, according to an embodiment of the present invention.

As illustrated in FIG. 6, sensor skin 62 can be used as a pressure sensitive skin in a variety of applications. In this example, pressure sensitive skin 62 is disposed around casing 34 along a substantial length of the casing or at several unique positions. The pressure sensitive skin is used, for example, during cementing to verify the level of cement 82. The fluid displaced by the cement does not have the same density as the cement, and thus a pressure sensitive skin can be used to determine the presence of the cement. If, on the other hand, the cement is replaced by sand and the casing by a sand screen, the pressure sensitive skin 62 can be used to verify sand level around the screen or to verify that a gravel pack is completed around the sand screen. Furthermore, if a material such as cement 82 is disposed about casing 34, the pressure sensitive skin 62 can detect pressures at multiple points and thereby determine the main directions of stresses applied by the formation against casing 34. In FIG. 6, the higher formation induced stresses are indicated by arrows 84. By determining the orientation of the higher stresses 84, perforations 36 can be oriented in the lowest stress direction.

Figure 7:
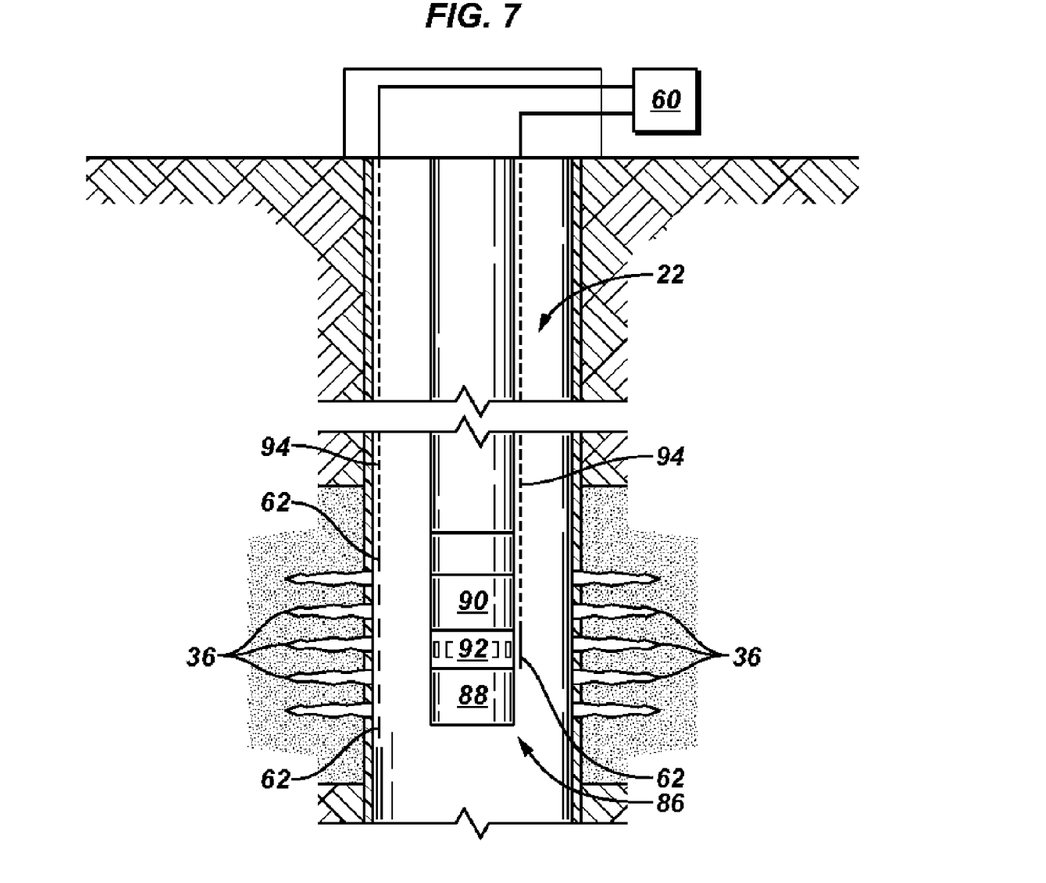
FIG. 7 is a front elevation view of another embodiment of a completion and skin sensor disposed in a well, according to an embodiment of the present invention.

Referring to FIG. 7, skin sensor 62 is placed proximate perforations of a casing or along a sand screen to detect sand passing therethrough. In such application, the sensing elements 66 would not necessarily be constructed as pressure sensors, but could be constructed as acoustic sensors effectively able to listen for sand or other particulates. As described above, the skin sensor also can be used to detect placement of a gravel pack.

With further reference to FIG. 7, a skin sensor also can be placed proximate the final, e.g. lowest, perforation of perforations 36. In this application, the skin sensor 62 is used with a feedback loop during a perforation operation to confirm detonation of all charges. Generally, the perforations are done in series so placement of a pressure skin sensor proximate the last perforation enables output of a pressure signal when the last, and thus all, perforations have been completed.

In FIG. 7, the completion 22 comprises an electric submersible pumping system 86 having a submersible motor 88, a submersible pump 90 and a pump intake 92. As illustrated, a skin sensor 62, such as a pressure skin sensor, can be placed proximate an inlet of pump intake 92 and/or an outlet of the submersible pump 90 to detect operation of the pump and, potentially, to help optimize operation of the pump by detecting whether the operating pressures remain within a desired range. In this application, as in other applications, the skin sensor 62 can be connected to a communication line 94, or the skin sensor 62, such as a tape style skin sensor, can be used as the communication path.

Figure 8:
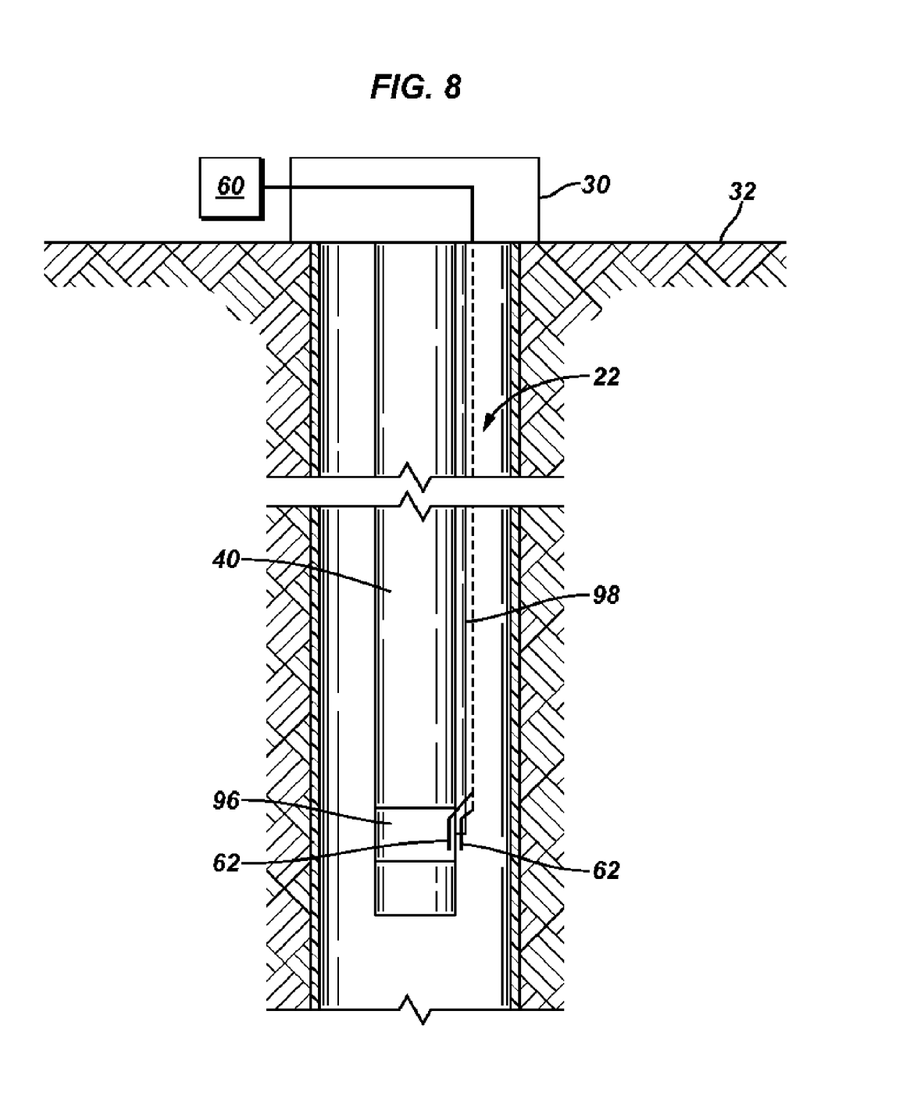
FIG. 8 is a front elevation view of another embodiment of a completion and skin sensor disposed in a well, according to an embodiment of the present invention.

In a similar application, completion 22 comprises a gas lift valve 96 used in a gas lift system. In this type of system, a powering fluid is pumped through an appropriate conduit 98 and injected into gas lift valve 96 to create a flow of production fluid through tubing 40. The mixture of powering fluid and production fluid flow to a desired separation and collection point, such as at surface 32. In this type of system, skin sensor 62 can be placed along the inside and/or outside of the gas lift valve 96 to measure, for example, pressure at those locations. By measuring and tracking pressures proximate the fluid injection location, the operation of the gas lift system can be optimized.

Figure 9:
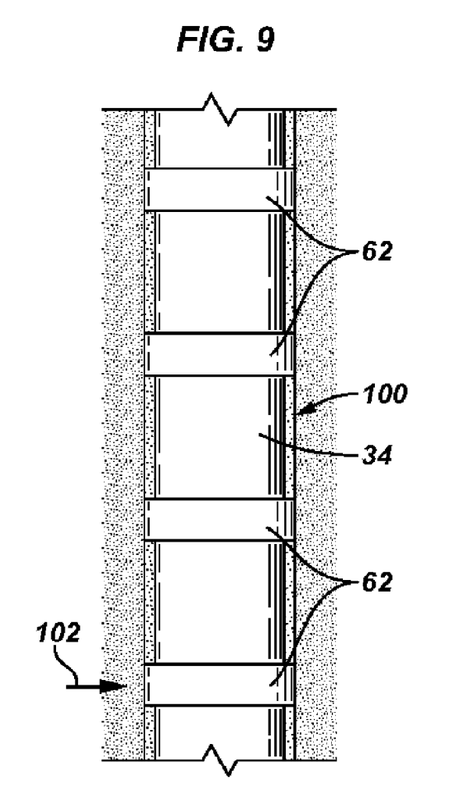
FIG. 9 is a view of another embodiment of a completion and skin sensor disposed in a well, according to an embodiment of the present invention.

The skin sensor 62 also can be used as a distributed pressure sensor in a variety of well-related applications, as illustrated in FIG. 9. As illustrated, skin sensor 62 can be deployed as a plurality of rings positioned along the casing or screen. Alternatively, a single, long pressure sensitive skin 62 can be deployed along a substantial length or the entire length of a casing or screen, such as casing 34. In the embodiment of FIG. 9, casing 34 is illustrated, but the casing 34 can be substituted with, for example, screen 38, illustrated in FIG. 1. Furthermore, a material 100, such as cement, sand or gravel, may be deployed about the exterior of the casing or screen. When pressure changes, the skin sensor 62 detects the pressure change. For example, pressure may change in a long horizontal well due to production of a fluid from the formation, or pressure may change in a vertical well due to different permeabilities of the formation. Regardless, skin sensor 62 can detect a high/low pressure area 102 and provide that information to, for example, controller 60. Effectively, the skin sensor can determine and measure pressure waves in the wellbore.

Figure 10:
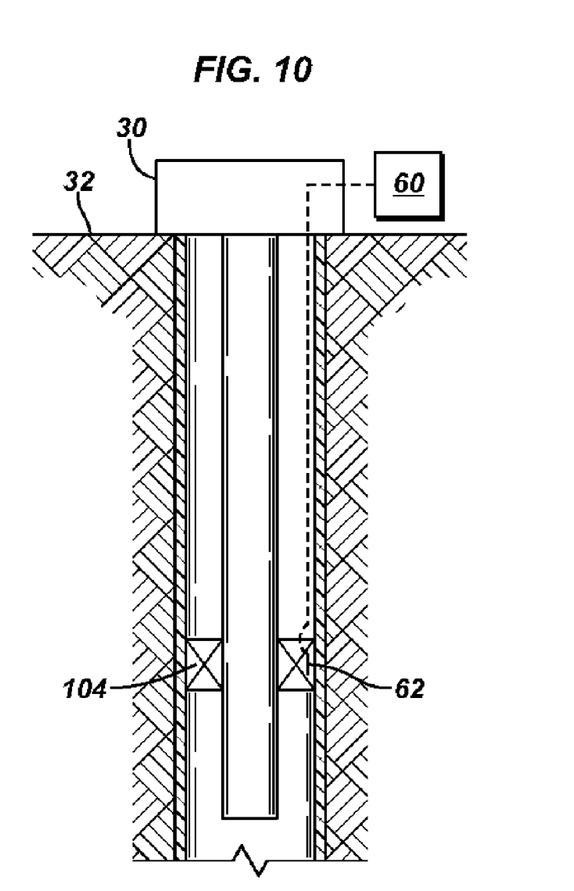
FIG. 10 is a front elevation view of another embodiment of a completion and skin sensor disposed in a well, according to an embodiment of the present invention.

In another embodiment, skin sensor 62 is used in conjunction with a packer 104, such as an inflatable packer, as illustrated in FIG. 10. In this embodiment, skin sensor 62 comprises a pressure sensitive skin positioned proximate the expansion element of packer 104, such as an inflatable element. The pressure sensitive skin 62 is used to measure pressure, e.g. inflation pressure, as the packer is expanded. The pressure sensitive skin also can be used across the expansion element of the packer to measure the pressure difference on opposing sides of the packer.

Figure 11:
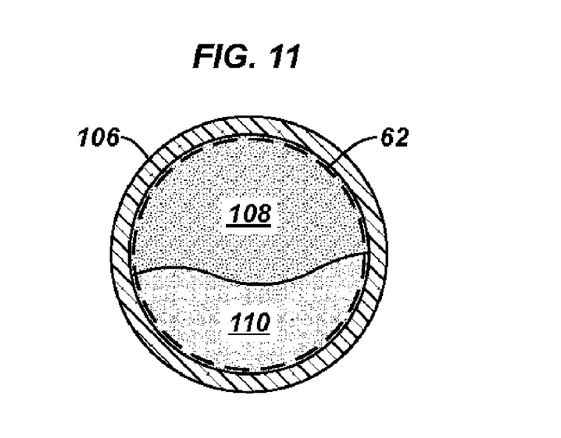
FIG. 11 is a cross-sectional view of a wellbore section in which a skin sensor is utilized, according to an embodiment of the present invention.

Referring to FIG. 11, skin sensor 62 also can be used to detect laminar versus turbulent flow through a tubing 106. For example, if two types of fluids, such as oil 108 and water 110, flow through tubing 106, a pressure sensitive skin 62 can be used to detect delamination due to the difference in density of the two fluids. If the pressure in tubing 106 remains constant, the level of water 110, and thus the level of oil 108, can be detected. However, skin sensor 62 also can be a chemical skin sensor or resistivity skin sensor to determine the different fluids, rather than relying on densities and pressures. With any of these sensors, the relative level of water/oil can be monitored and if that level remains constant, laminar flow can be assumed. Other fluids, including gases, also can be detected, and the data analyzed to determine flow characteristics through tubing 106. As a chemical skin sensor, sensor 62 also can be used to determine the chemical composition of the fluid or constituents within the fluid. For example, a chemical skin sensor 62 can be used to detect hydrogen sulfide (H2S) or carbon dioxide (CO2) in the fluid. Such sensors also can be used to detect scale formation in the wellbore resulting from, for instance, barium sulfate (BaSO4) and/or calcium carbonate (CaCO3).

Figure 12:
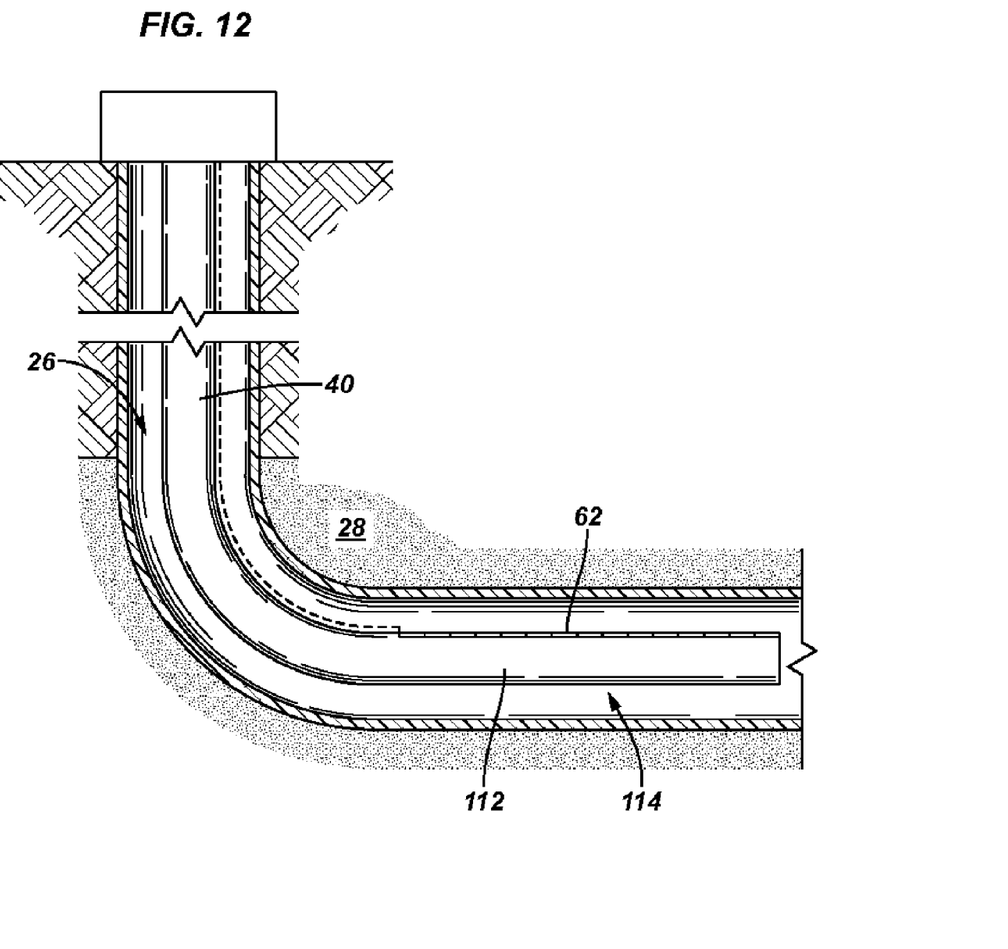
FIG. 12 is a front elevation view of another embodiment of a completion and skin sensor disposed in a well, according to an embodiment of the present invention.

A skin sensor 62 also can be used in injection wells, such as the deviated injection well illustrated in FIG. 12. In this embodiment, skin sensor 62, e.g. a pressure sensitive skin, is deployed along a horizontal tubing section 112 located in a horizontal section 114 of wellbore 26. Fluid is injected into the well through tubing 40 and horizontal tubing section 112 and disbursed outwardly into formation 28. Skin sensor 62 measures and provides data on the pressures along horizontal section 114 to enable creation of an injection profile. For example, higher pressures measured by the skin sensor 62 are indicative of areas of greater injection. The data provided by skin sensor 62 also can be used to determine flow rates. In other applications, the pressure and/or temperature data provided by skin sensor 62 is used to determine or to assist in determining flow rates within both injection and production wells.

Figure 13:
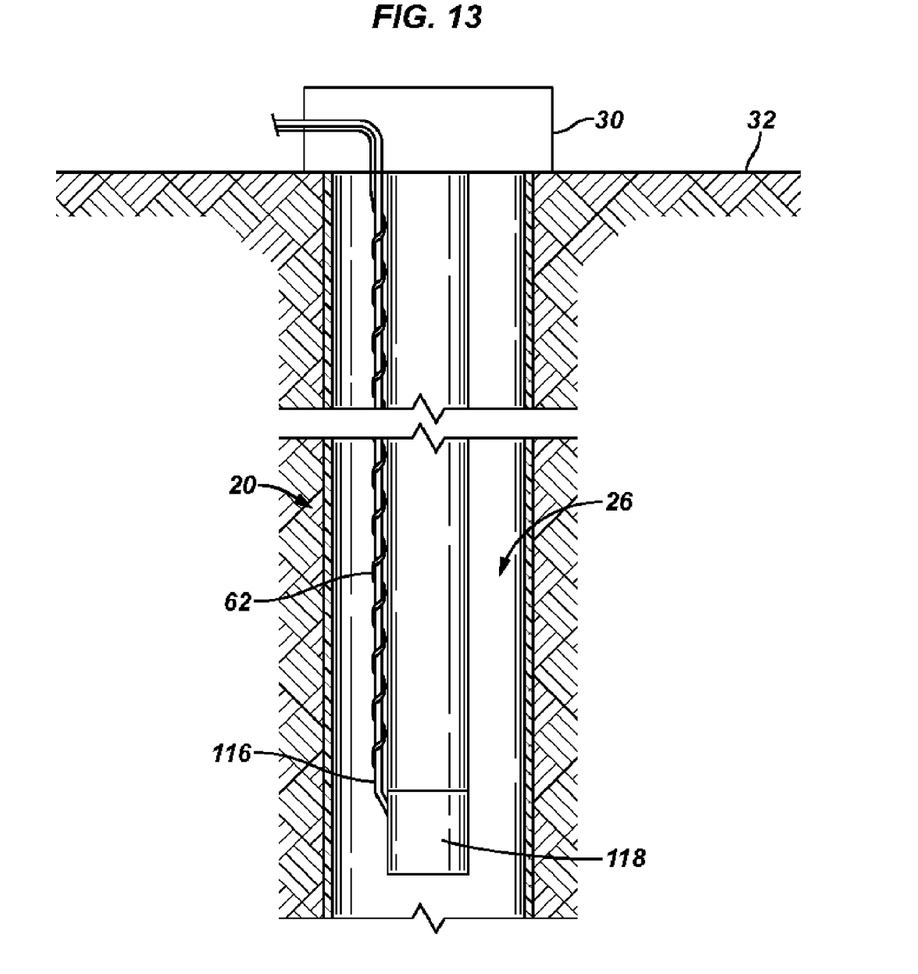
FIG. 13 is a front elevation view of another embodiment of a completion and skin sensor disposed in a well, according to an embodiment of the present invention.

As illustrated in FIG. 13, skin sensor 62 also can be combined with a control line 116, such as a power cable or communication line. In the example illustrated, control line 116 is used to power a completion 118 or to communicate signals to or from completion 118. The control line 116 is wrapped or covered with skin sensor 62 which, for example, is in tape form or sheet form as discussed with reference to FIGS. 2 and 3. The skin sensor 62 covering control line 116 can be used to provide data on subject parameters along wellbore 26, but the skin sensor also can be used for other purposes, such as to insulate control line 116.

It should be noted that skin sensor 62 is amenable to use in other applications. For example, a pressure sensitive skin is readily adaptable to monitor pressures during drill string tests in which pressure buildups are allowed to occur. However, the skin sensor 62 also may be adapted to sense a variety of other parameters in other environments.

Accordingly, although only a few embodiments of the present invention have been described in detail above, those of ordinary skill in the art will readily appreciate that many modifications are possible without materially departing from the teachings of this invention. Accordingly, such modifications are intended to be included within the scope of this invention as defined in the claims.

What is claimed is:

1. A system, comprising:
a downhole completion deployed in a wellbore, the downhole completion having a pressure sensitive skin sensor comprising a plurality of sensor cells that each provide independent sensing capability with respect to other sensor cells of the plurality of sensor cells, the sensor cells being joined in a flexible skin-like material, wherein the downhole completion comprises a sand screen and wherein the pressure sensitive skin sensor is deployed along an interior of the sand screen.

2. The system as recited in claim 1, further comprising a transmitter, wherein the pressure sensitive skin sensor is electrically coupled to the transmitter and a transmitter is able to transmit signals corresponding to pressures acting on the pressure sensitive skin sensor.

3. The system as recited in claim 2, further comprising a receiver wirelessly coupled to the transmitter to receive the signals sent from the transmitter.

4. A method, comprising:
embedding a plurality of independent sensor elements in a thin, flexible skin to form a skin sensor;
deploying the skin sensor along an interior of a sand screen positioned at a selected location within a wellbore; and
determining a characteristic of a downhole event via a parameter sensed by the skin sensor.

5. The method as recited in claim 4, wherein determining comprises sensing a pressure.

6. The method as recited in claim 4, wherein determining comprises sensing a temperature.

7. The method as recited in claim 4, wherein determining comprises sensing a resistivity.

8. The method as recited in claim 4, wherein determining comprises sensing an acoustic event.

9. The method as recited in claim 4, wherein determining comprises sensing a chemical constituent in the wellbore.

10. The method as recited in claim 4, wherein determining comprises determining whether sand is passing through a sand screen.

11. The method as recited in claim 4, further comprising utilizing the skin sensor as a communication path.

12. The method as recited in claim 4, wherein determining comprises determining the occurrence of a pressure wave.

13. A method as recited in claim 4, wherein determining comprises determining whether a fluid flow is laminar or turbulent.

14. The method as recited in claim 4, wherein determining comprises determining the presence of water in a downhole fluid.

15. The method as recited in claim 4, wherein determining comprises determining the presence of a gas in a downhole fluid.

16. The method as recited in claim 4, wherein determining comprises determining the presence of solid objects in a fluid stream at a downhole location.

17. A system for sensing parameters at a downhole location, comprising:
- a tubing coupled to a sand screen for deployment downhole; and
- a skin sensor having a plurality of sensor elements able to operate independently of each other, the plurality of sensor elements being embedded in a thin, flexible skin material that is applied along an interior of the sand screen.

18. The system as recited in claim 17, wherein the tubing comprises a production tubing.

19. The system as recited in claim 17, wherein the tubing comprises a tubular completion.

20. The system as recited in claim 17, wherein the skin sensor comprises a pressure sensitive skin sensor.

21. The system as recited in claim 17, wherein the skin sensor comprises a chemical sensitive skin sensor.

22. The system as recited in claim 17, wherein the skin sensor is formed as an elongated tape.

23. A method, comprising:
- providing a plurality of independent sensor elements joined by a thin, flexible material to form a pressure sensitive skin sensor;
- deploying the pressure sensitive skin sensor along an interior of a sand screen through which a fluid is conducted;
- sensing pressure changes in the fluid;
- transmitting data on the pressure changes to a control system; and
- processing the data on the control system to evaluate a fluid production related parameter based on the pressure changes.

24. The method as recited in claim 23, further comprising wirelessly transmitting data on sensed pressure changes from a downhole location.

25. The method as recited in claim 23, wherein deploying comprises deploying the pressure sensitive skin sensor in the form of a tape having a plurality of consecutive, flat sensor elements.

26. The method as recited in claim 23, wherein deploying comprises deploying the pressure sensitive skin sensor in the form of a sheet having a plurality of consecutive, flat sensor elements extending along two dimensions.

\* \* \* \* \*